United States Patent
Null

[19]

[11] Patent Number: 5,344,474
[45] Date of Patent: Sep. 6, 1994

[54] GAS SEPARATION DEVICE

[75] Inventor: Robert A. Null, Lakewood, Colo.

[73] Assignee: Air Dry Corporation of America, Moorpark, Calif.

[21] Appl. No.: 54,391

[22] Filed: Apr. 28, 1993

[51] Int. Cl.⁵ .................................... B01D 53/04
[52] U.S. Cl. .............................. 55/344; 96/115; 96/130; 96/133
[58] Field of Search ............ 55/344; 95/130; 96/108, 96/115, 121, 130, 133

[56] References Cited

U.S. PATENT DOCUMENTS

| | | | |
|---|---|---|---|
| 3,237,377 | 3/1966 | Skarstrom | 95/130 X |
| 3,891,411 | 6/1975 | Meyer | 55/26 |
| 3,922,149 | 11/1975 | Ruder et al. | 95/130 X |
| 4,100,421 | 7/1978 | Tabata et al. | 96/115 X |
| 4,222,750 | 9/1980 | Gauthier et al. | 95/130 X |
| 4,295,863 | 10/1981 | Lattuada | 55/179 X |
| 4,430,306 | 2/1984 | Namba et al. | 96/130 X |
| 4,685,939 | 8/1987 | Kratz et al. | 95/130 X |
| 4,738,692 | 4/1988 | Fresch et al. | 55/26 |
| 4,822,384 | 4/1989 | Kato et al. | 96/130 X |
| 4,867,766 | 9/1989 | Campbell et al. | 96/130 X |
| 4,919,695 | 4/1990 | Trepaud | 55/179 |
| 4,941,894 | 7/1990 | Black | 55/20 |
| 4,983,190 | 1/1991 | Verrando et al. | 96/130 X |
| 5,087,178 | 2/1992 | Wells | 55/33 X |
| 5,114,441 | 5/1992 | Kanner et al. | 96/130 X |

*Primary Examiner*—Robert Spitzer
*Attorney, Agent, or Firm*—Marshall, O'Toole, Gerstein, Murray & Borun

[57] ABSTRACT

A desiccant tower receives air at its air inlet and concentrates the oxygen in this air in order to provide a gas at its gas outlet which has a concentration of oxygen exceeding the concentration of oxygen normally found in air. A bypass conduit is coupled to the desiccant tower so as to syphon off gas from the desiccant tower at a point where the gas within the desiccant tower has a concentration of oxygen which is less than the concentration of oxygen in the gas at the gas outlet of the desiccant tower. The gases at the gas outlet of the desiccant tank and in the conduit are mixed so as to produce an output gas mixture having a desired concentration of oxygen. The desired concentration of oxygen is less than a desiccant tower can ordinarily provide but greater than the concentration of oxygen normally found in air.

26 Claims, 4 Drawing Sheets

GAS SEPARATION DEVICE

FIELD OF THE INVENTION

The present invention relates to oxygen concentration systems and, more particularly, to oxygen concentration systems which produce a reduced output oxygen purity and an increased outlet flow during stable operation.

BACKGROUND OF THE INVENTION

An oxygen concentration system, particularly a pressure swing adsorption (PSA) oxygen concentration system, is used to provide an output gas mixture which has a higher concentration of oxygen than is ordinarily found in air. Specifically, the pressure swing adsorption oxygen concentration system separates oxygen and argon from the remainder of the gases, such as nitrogen, found in air, and produces an output gas mixture which is ideally 95.6% oxygen and 4.4% argon. In actual practice, however, an oxygen concentration system usually produces an output gas mixture consisting of about 90% to 93% oxygen. A 2% to 5% constituency of nitrogen in the output gas mixture of the oxygen concentration system is generally acceptable for many industrial and medical applications.

A typical pressure swing adsorption oxygen concentration system includes two desiccant towers each having a desiccant bed. While a first of these two desiccant towers is operated in an adsorption cycle such that its desiccant bed adsorbs moisture and nitrogen from an inlet air in order to produce a dry output gas mixture which is rich in oxygen, the second of the two desiccant towers is operated in a purge cycle. During this purge cycle, moisture and nitrogen are purged from the desiccant bed of the second desiccant tower. Both of the desiccant towers in a pressure swing adsorption oxygen concentration system need a substantial volume of unsaturated desiccant material above the mass transfer zone in order to ensure adequate adsorption of nitrogen. With an adequate volume of unsaturated desiccant material above the mass transfer zone, normal variations in the temperature, humidity, and pressure of the inlet air will not significantly affect the concentration of oxygen in the output gas mixture. Accordingly, stable operation of the pressure swing adsorption oxygen concentration system is achieved.

A relatively new application that is possible for the pressure swing adsorption oxygen concentration system is the production of feed gas for the generation of ozone ($O_3$). Ozone is used, for example, in the purification of water and in the treatment of sewage. Ozone may be typically produced by a corona discharge ozone generator. Recent studies indicate that a corona discharge ozone generator achieves optimum operation when supplied with a feed gas having a concentration of oxygen between 50% and 65%. The other gases in the optimum feed gas supplied to the corona discharge ozone generator are inert gases such as nitrogen and argon.

While it might be possible to use the pressure swing adsorption oxygen concentration system, which produces an output gas mixture having approximately a 90% concentration of oxygen, in order to supply feed gas to a corona discharge ozone generator, which requires a feed gas having a concentration of oxygen between 50% and 65%, such a use of a pressure swing adsorption oxygen concentration system is not straightforward. For example, one way to achieve a reduced concentration of oxygen in the output gas mixture of a pressure swing adsorption oxygen concentration system is to increase the flow of gas through its desiccant towers. Thus, if the outlet flow from a pressure swing adsorption oxygen concentration system exceeds its design limit, the concentration of oxygen in its output gas mixture decreases since all of the nitrogen can no longer be adsorbed from the inlet air supplied to the pressure swing adsorption oxygen concentration system. By so overloading the pressure swing adsorption oxygen concentration system, the concentration of oxygen in its output gas mixture can theoretically be reduced to the desired 50% to 65% range. However, there would be little or no unsaturated desiccant material above the mass transfer zone if the gas flow through the desiccant towers is increased to such an extent. As a result, any slight variations in the temperature, humidity and/or pressure of the inlet air would cause radical changes in the concentration of oxygen in the output gas mixture, and could cause degradation of the desiccant beds to such an extent that a system failure would result. Accordingly, as a practical matter, a pressure swing adsorption oxygen concentration system cannot achieve a stable operating condition when the flow of gas through its desiccant towers is increased sufficiently to produce the desired concentration of oxygen in the output gas mixture.

Another approach to achieve the desired 50% to 65% concentration of oxygen in the output gas mixture is to operate the pressure swing adsorption oxygen concentration system optimally so as to produce the typical 90% concentration of oxygen in its output gas, and then mix this output gas with dry air in the proper proportion to obtain the required 50% to 65% concentration of oxygen in the output gas mixture. However, the dry air to be mixed with the output gas of the pressure swing adsorption oxygen concentration system must be compressed to at least the same pressure as the output gas from the pressure swing adsorption oxygen concentration system and must be dried to at least $-60°$ C. atmospheric dew point in order to meet the dew point requirements for a corona discharge ozone generator. This arrangement requires both a pressure swing adsorption oxygen concentration system and an air drier wherein the air drier delivers a dry gas at or below the required dew point to the output gas of the pressure swing adsorption oxygen concentration system.

SUMMARY OF THE INVENTION

In the present invention, a first gas having a first concentration of oxygen is provided by an oxygen concentrator and is combined with a second gas having a second concentration of oxygen. The second concentration of oxygen is less than the first concentration of oxygen, and the second gas has an appropriate pressure and dew point. The resulting combination of the first and second gases, i.e. the output gas mixture, has a desired concentration of oxygen. The concentration of oxygen in this output gas mixture is less than the concentration of oxygen in the first gas provided by the oxygen concentrator but is greater than the concentration of oxygen normally found in air.

Thus, according to one aspect of the present invention, a system for producing an output gas mixture having a desired concentration of oxygen, which is greater than the concentration of oxygen normally found in air, includes an oxygen concentration means for producing a first gas having a first concentration of oxygen, wherein the first concentration of oxygen is greater than the desired concentration of oxygen. A supplying means supplies a second gas having a second concentration of oxygen, wherein the second concentration of oxygen is less than the first concentration of oxygen. A mixing means, coupled to the oxygen concentration means and to the supplying means, mixes the first and second gases to produce the output gas mixture having the desired concentration of oxygen.

According to another aspect of the invention, a system for producing an output gas mixture having a desired concentration of oxygen, which is greater than the concentration of oxygen normally found in air, includes an oxygen concentration means for receiving inlet air containing oxygen and for producing a first gas by concentrating the oxygen in the inlet air, wherein the first gas has a first concentration of oxygen, wherein the first concentration of oxygen is greater than the desired concentration of oxygen, and wherein the oxygen concentration means has a gas flowing therethrough. A supplying means supplies a second gas having a second concentration of oxygen, wherein the second concentration of oxygen is less than the first concentration of oxygen, wherein the supplying means is coupled to a coupling point of the oxygen concentration means so as to receive a portion of the gas flowing therethrough, and wherein the coupling point is selected so that the concentration of oxygen in the gas flowing through the oxygen concentration means at the coupling point is less than the first concentration of oxygen. A mixing means, coupled to the oxygen concentration means and to the supplying means, mixes the first and second gases to produce the output gas mixture having the desired concentration of oxygen.

According to a further aspect of the invention, a system for producing an output gas mixture having a desired concentration of oxygen, which is greater than the concentration of oxygen normally found in air, includes a first means for supplying inlet air containing oxygen, and a desiccant tower having an inlet coupled to the first means and having an outlet, wherein the desiccant tower is arranged to produce at its outlet a gas having a first concentration of oxygen by concentrating the oxygen contained in the inlet air, wherein the first concentration of oxygen in the gas at the outlet of the desiccant tower is greater than the desired concentration of oxygen in the output gas mixture, and wherein the desiccant tower has a gas flowing therethrough. A second means, having an inlet coupled to the outlet of the desiccant tower and having an outlet, provides a gas at its outlet based upon the gas at the outlet of the desiccant tower. A conduit has an inlet and an outlet, wherein the inlet of the conduit is coupled to the desiccant tower at a coupling point so as to receive a portion of the gas flowing therethrough, wherein the coupling point is selected so that the concentration of oxygen in the gas flowing through the desiccant tower at the coupling point is less than the first concentration of oxygen in the gas at the outlet of the desiccant tower, wherein the conduit is arranged so as to supply a gas at its outlet, and wherein the gas at the outlet of the conduit has an oxygen concentration level which is substantially equal to the concentration of oxygen in the gas flowing through the desiccant tower at the coupling point. A mixing means, which is coupled to the outlet of the second means and to the outlet of the conduit, mixes the gases at the outlet of the second means and at the outlet of the conduit in order to produce the output gas mixture having the desired concentration of oxygen.

The present invention, as described above, permits stable operation of the oxygen concentrator. Also, the present invention, in at least some of its aspects, avoids the use of a separate air drier, and increases output flow more efficiently than does a separate source of dry air. A separate source of dry air has losses because of the additional apparatus required to supply the dry air, and because of the hoses and fittings necessary to connect the additional apparatus to the output of the oxygen concentrating system. Such losses decrease the efficiency of the separate source of dry air.

BRIEF DESCRIPTION OF THE DRAWING

These and other features and advantages will become more apparent from a detailed consideration of the invention when taken in conjunction with the drawing in which.

DETAILED DESCRIPTION

Figure 1:
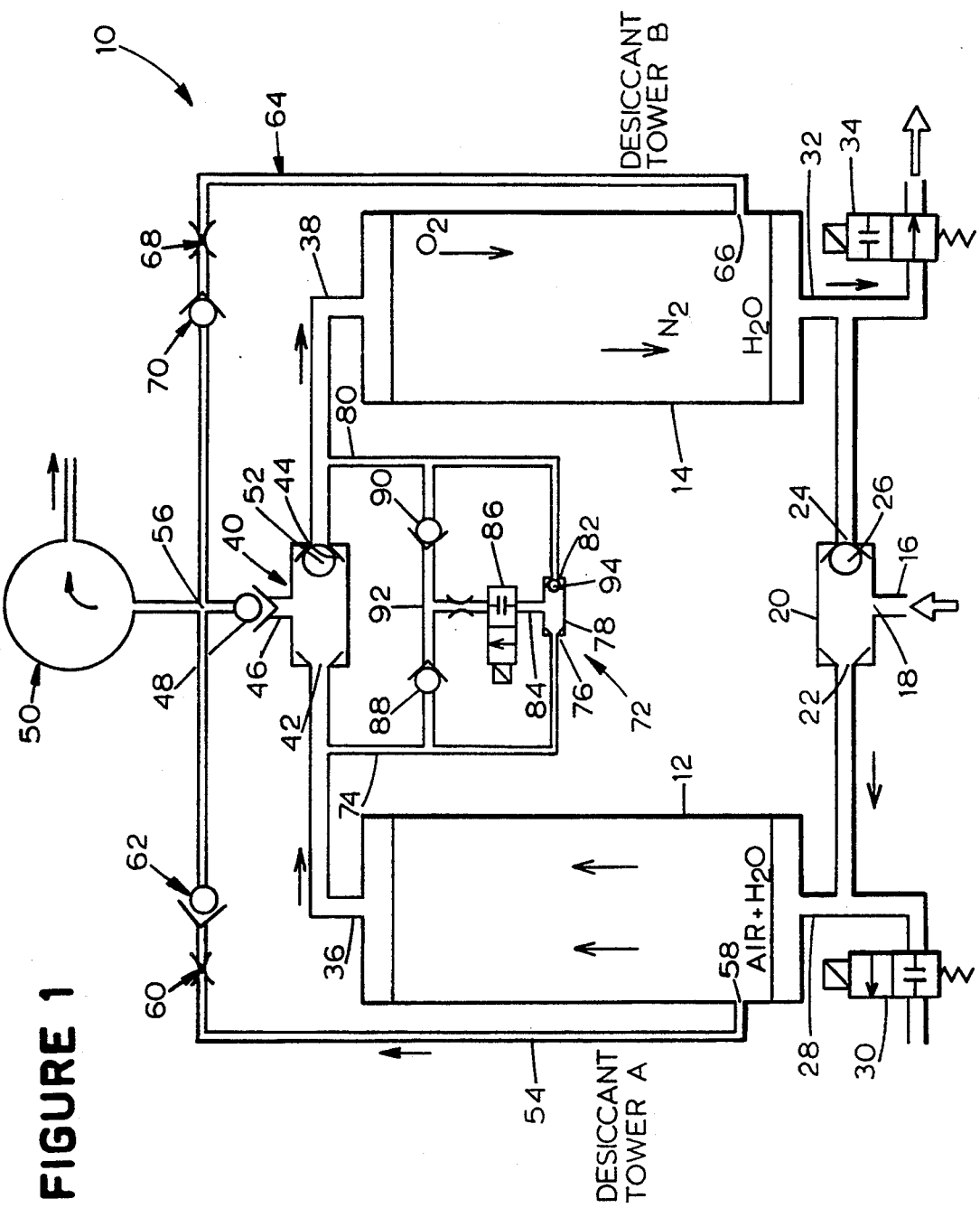
FIG. 1 is an illustration of a pressure swing adsorption oxygen concentration system having two desiccant towers, Desiccant Tower A and Desiccant Tower B, wherein Desiccant Tower A is operated in an adsorption cycle and Desiccant Tower B is operated in a purge cycle.

An oxygen concentration system 10 according to the present invention is shown in FIG. 1. The oxygen concentration system 10 includes desiccant towers 12 and 14. An air inlet 16 is coupled to an inlet port 18 of a shuttle valve 20. The shuttle valve 20 has a first outlet port 22 and a second outlet port 24. The flow of air from the air inlet 16 through the inlet port 18 to the outlet ports 22 and 24 of the shuttle valve 20 is controlled by a control member 26 which, when it is positioned against the outlet port 24, allows air to flow from the inlet port 18 to the outlet port 22 and, when it is positioned against the outlet port 22, allows air to flow from the inlet port 18 to the outlet port 24.

The outlet port 22 of the shuttle valve 20 is coupled both to an air inlet 28 of the desiccant tower 12 and to a solenoid valve 30. The outlet port 24 of the shuttle valve 18 is coupled both to an air inlet 32 of the desiccant tower 14 and to a solenoid valve 34. The desiccant tower 12 has a gas outlet 36, and the desiccant tower 14 has a gas outlet 38. The gas outlet 36 of the desiccant tower 12 and the gas outlet 38 of the desiccant tower 14 are coupled to a shuttle valve 40. The shuttle valve 40 has inlet ports 42 and 44. The inlet port 42 is coupled to the gas outlet 36 of the desiccant tower 12, and the inlet port 44 is coupled to the gas outlet 38 of the desiccant tower 14. An outlet port 46 of the shuttle valve 40 is coupled through a check valve 48 to a mixing tank 50. The check valve 48 is arranged to allow gas flow from the outlet port 46 of the shuttle valve 40 to the mixing tank 50 but to block gas flow from the mixing tank 50 to the outlet port 46 of the shuttle valve 40.

As shown in FIG. 1, a control member 52 controls the flow of gas from the inlet ports 42 and 44 to the outlet port 46 of the shuttle valve 40. As is well known in the art, the control member 52 of the shuttle valve 40 is provided with orifices to allow sufficient flow from one of the desiccant towers 12 and 14 to the other so that dry purging gas is allowed to flow from the desiccant tower being operated in its adsorption cycle to the desiccant tower being operated in its purge cycle.

As described thus far, the oxygen concentration system 10 is well known and provides a gas through the check valve 48 having a concentration of oxygen of about 90%. In order to reduce this purity of oxygen, the gas flowing through the check valve 48 is mixed with a dry gas having a much lower concentration of oxygen.

Therefore, according to the preferred embodiment of the present invention, a bypass conduit 54 is coupled between the desiccant tower 12 and a junction 56 of the check valve 48 and the mixing tank 50. The bypass conduit 54 is connected to the desiccant tower 12 at a coupling point 58, and syphons off a portion of the gas flowing through the desiccant tower 12 for supply to the mixing tank 50.

As air flows through a desiccant tower, the desiccant bed therein first dries the gas and then removes the nitrogen therefrom. Thus, by properly selecting the coupling point 58, the gas flowing through the desiccant tower 12 at the coupling point 58 is dry but has a concentration of oxygen such that, when the gas syphoned off by the bypass conduit 54 is mixed with the gas flowing through the check valve 48, an output gas mixture is produced having the desired concentration of oxygen. For example, the coupling point 58 may be selected such that, when the gas syphoned off by the bypass conduit 54 is mixed with the gas flowing through the check valve 48, an output gas mixture is produced having a concentration of oxygen in the range of 50%-65%. (As mentioned above, the optimum concentration of oxygen in the gas supplied to a corona discharge ozone generator falls within this range.)

The bypass conduit 54 has a flow regulator, in the form of a restriction 60, and a check valve 62 therein. The restriction 60 is arranged to control the concentration of oxygen in the output gas mixture within the mixing tank 50. The check valve 62 is arranged to allow gas flow through the bypass tube 54 from the coupling point 58 of the desiccant tower 12 to the junction 56 but to block gas flow through the bypass tube 54 from the junction 56 to the coupling point 58 of the desiccant tower 12.

Similarly, a bypass conduit 64 is coupled between the desiccant tower 14 and the junction 56. The bypass conduit 64 is connected to the desiccant tower 14 at a coupling point 66, and syphons off a portion of the gas flowing through the desiccant tower 14 for supply to the mixing tank 50. By properly selecting the coupling point 66, the gas flowing through the desiccant tower 14 at the coupling point 66 is dry but has a concentration of oxygen such that, when the gas syphoned off by the bypass conduit 64 is mixed with the gas flowing through the check valve 48, an output gas mixture is produced having the aforementioned desired concentration of oxygen. That is, using the example above, the coupling point 66 may be selected such that, when the gas syphoned off by the bypass conduit 64 is mixed with the gas flowing through the check valve 48, an output gas mixture is produced having a concentration of oxygen in the range of 50%-65%.

The bypass conduit 64 has a flow regulator, in the form of a restriction 68, and a check valve 70 therein. The restriction 68 is arranged to control the concentration of oxygen in the output gas mixture within the mixing tank 50. The check valve 70 is arranged to allow gas flow through the bypass conduit 64 from the coupling point 66 of the desiccant tower 14 to the junction 56 but to block gas flow through the bypass conduit 64 from the junction 56 to the coupling point 66 of the desiccant tower 14.

In operation, when the control member 24 of the shuttle valve 20, the solenoid valves 30 and 34, and the control member 52 of the shuttle valve 40 are in the positions shown in FIG. 1, the desiccant tower 12 is operated in an adsorption cycle and the desiccant tower 14 is operated in a purge cycle. Accordingly, air is supplied to the desiccant tower 12 from the air inlet 16, through the shuttle valve 20, and through the air inlet 28. As air flows through the desiccant tower 12, first the moisture, and then the nitrogen, in the air is adsorbed by the desiccant bed within the desiccant tower 12. Thus, as air passes through the desiccant tower 12, the air is changed to a gas consisting of approximately 90-95% oxygen, 1-6% nitrogen, and 4% argon. Since most of the nitrogen in the air is adsorbed by the desiccant bed in the desiccant tower 12, the volume of the gas at the gas outlet 36 of the desiccant tower 12 is much lower than the volume of the air entering the desiccant tower 12 through the air inlet 28. Dry, oxygen rich gas then exits the desiccant tower 12 through the gas outlet 36 and flows through the shuttle valve 40 and through the check valve 48 to the mixing tank 50.

The bypass conduit 54 is coupled to the desiccant tower 12 at the coupling point 58 where the moisture, but not the nitrogen, has been adsorbed from the inlet air. The pressure of the gas within the desiccant tower 12 at this coupling point 58 is higher than the pressure of the gas at the junction 56. That is, the pressure of the gas mixture supplied to the mixing tank 50 from the gas outlet 36 of the desiccant tower 12 is reduced due to the pressure drops associated with the desiccant bed in the desiccant tower 12, the shuttle valve 40, and the check valve 48. Therefore, dry gas flows through the bypass conduit 54, through the restriction 60, and through the check valve 62 to the junction 56. The restriction 60 limits the flow of dry gas through the bypass conduit 54 so that the amount of dry gas supplied to the mixing tank 50 by the bypass conduit 54, when mixed with the high oxygen concentration gas supplied through the check valve 48 from the desiccant tower 12, produces the desired concentration of oxygen in the output gas mixture within the mixing tank 50. Increasing the size of the restriction 60 (i.e. increasing the flow through the restriction 60) decreases the concentration of oxygen in the output gas mixture within the mixing tank 50, and decreasing the size of the restriction 60 (i.e. decreasing the flow through the restriction 60) increases the concentration of oxygen in the output gas mixture within the mixing tank 50.

As the desiccant tower 12 is operated in its adsorption cycle, the desiccant tower 14 is operated in its purge cycle. Thus, the desiccant bed of the desiccant tower 14 is purged of nitrogen and moisture by the flow of dry gas from the desiccant tower 12 through the gas outlet 36, through the shuttle valve 40 (i.e. through the purge orifices of the control member 52), through the gas outlet 38 of the desiccant tower 14, through the desiccant tower 14, through the air inlet 32 of the desiccant tower 14, and through the solenoid valve 34 to atmosphere Also, while the desiccant tower 12 is operated during its adsorption cycle and the desiccant tower 14 is operated during its purge cycle, as shown in FIG. 1, the check valve 70 prevents gas flow from the junction 56 through the bypass conduit 64 to the coupling point 66 of the second desiccant tank 14; otherwise, such a gas flow would disrupt the purge cycle of the desiccant tank 14.

There may be times during the operating cycle of the oxygen concentration system 10 when the pressure in the desiccant tower 12 is lower than the pressure at the junction 56 such that dry gas from the coupling point 58 of the desiccant tower 12 will not flow through the bypass conduit 54. Without the mixing tank 50, the absence of dry gas flowing through the bypass conduit 54 would result in an increase in the concentration of oxygen in the output gas mixture supplied by the oxygen concentration system 10. The mixing tank 50 levels the concentration of oxygen in the output gas mixture despite fluctuations in the pressure between the junction 56 and the coupling point 58 and despite fluctuations in the concentrations of oxygen in the gases provided by the bypass conduit 54 and by the gas outlet 36 of the desiccant tower 12.

As the oxygen concentration system 10 approaches the point where the desiccant bed within the desiccant tower 12 becomes saturated with moisture and nitrogen and where the desiccant bed within the desiccant tower 14 is substantially purged of the moisture and nitrogen which it had previously adsorbed, a pressurization circuit 72 and the solenoid valve 34 are operated in order to repressurize the desiccant tank 14. This pressurization circuit 72 includes a conduit 74 having one end connected to the gas outlet 36 of the desiccant tower 12 and a second end connected to an inlet port 76 of a shuttle valve 78. A conduit 80 has one end connected to the gas outlet 38 of the desiccant tower 14 and a second end connected to an inlet port 82 of the shuttle valve 78. An outlet port 84 of the shuttle valve 78 is connected to a solenoid valve 86. The conduits 74 and 80 are interconnected by a pair of check valves 88 and 90, and a junction 92 of the check valves 88 and 90 is connected to the solenoid valve 86. A control member 94 controls the flow of gas between the inlet ports 76/82 and the outlet port 84.

Figure 2:
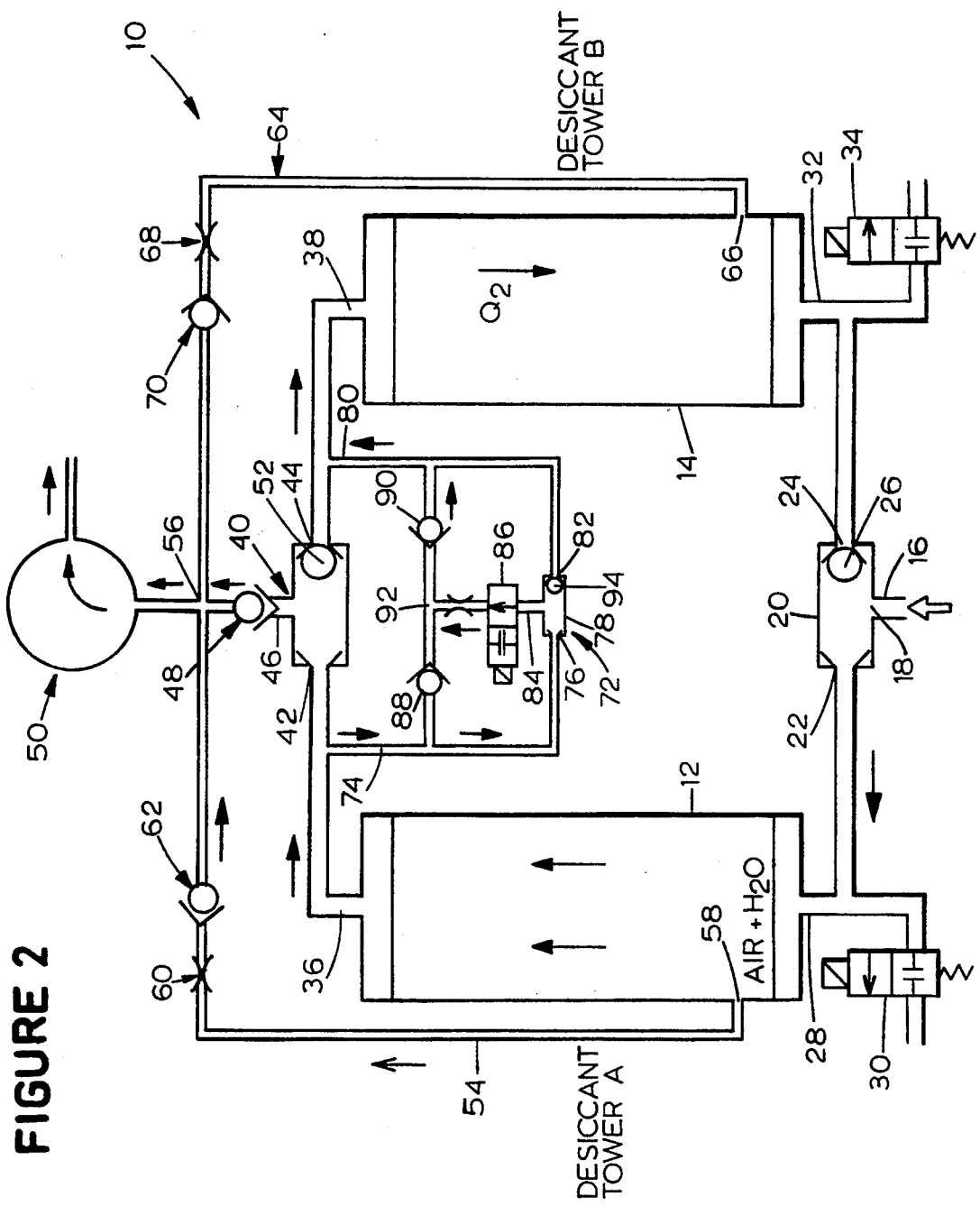
FIG. 2 shows the arrangement of FIG. 1 wherein Desiccant Tower B is operated in a pressurization cycle.

In the position of the solenoid valve 86 shown in FIG. 1, the repressurization circuit 72 has no gas flow through it. In order to repressurize the desiccant tower 14, the solenoid valves 34 and 86 are operated to the positions shown in FIG. 2. Thus, as shown in FIG. 2, gas flows from the gas outlet 36 of the desiccant tower 12 through the conduit 74, through the shuttle valve 78, through the solenoid valve 86, through the check valve 90, through a portion of the conduit 80, and through the gas outlet 38 into the desiccant tower 14. The solenoid valve 34, having the position shown in FIG. 2, prevents the flow of gas from the desiccant tower 14 through its air inlet 32 and through the solenoid valve 34 to atmosphere. Accordingly, gas pressure is built up within the desiccant tower 14.

Figure 3:
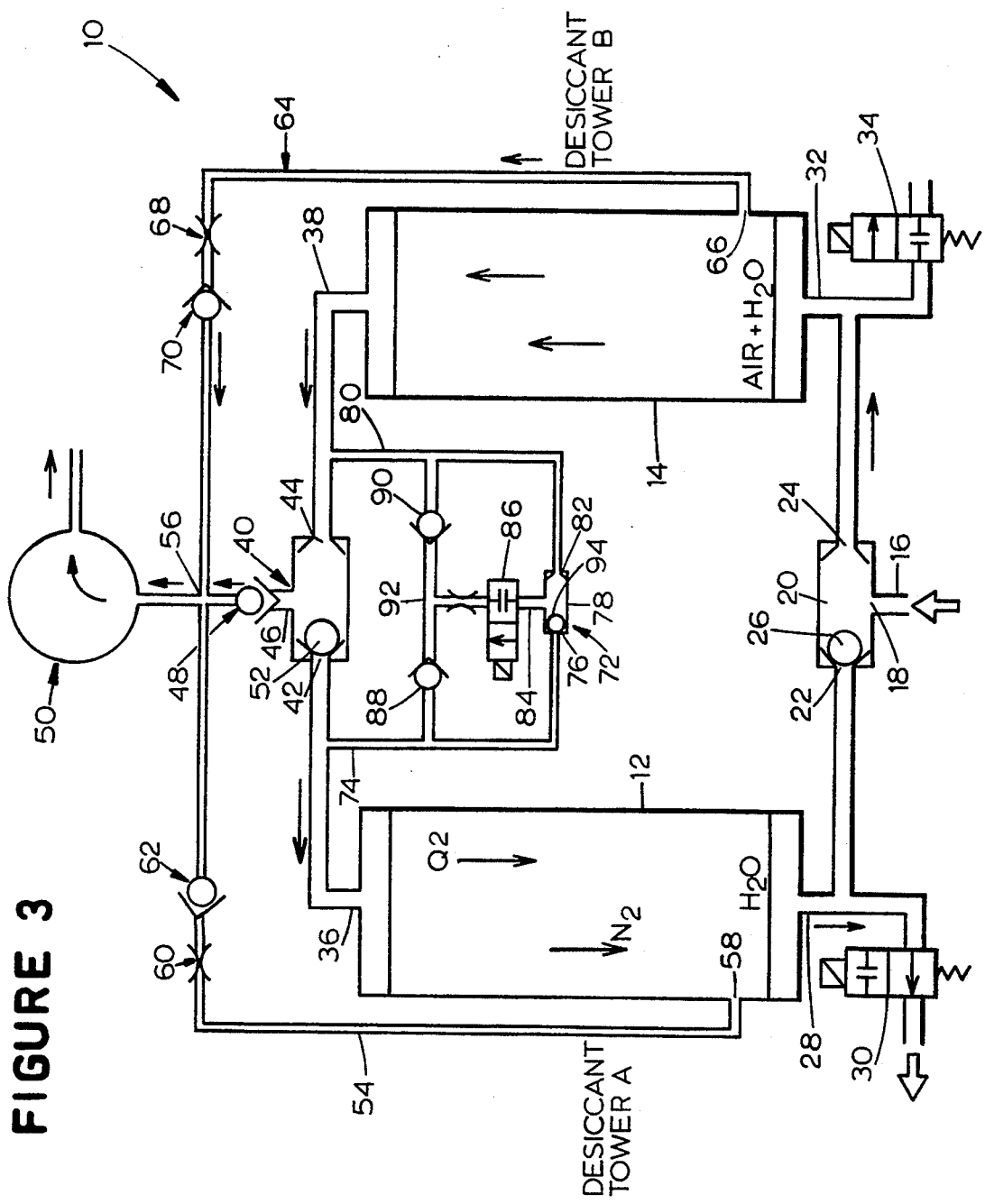
FIG. 3 shows the pressure swing adsorption oxygen concentration system of FIG. 1 wherein Desiccant Tower B is operated in an adsorption cycle and Desiccant Tower A is operated in a purge cycle; and, FIG. 4 shows the arrangement of FIG. 3 wherein Desiccant Tower A is operated in a pressurization cycle.

When the pressure within the desiccant tower 14 is at the desired level, the control member 26 of the shuttle valve 18, as shown in FIG. 3, is moved from the outlet port 24 to the outlet port 22, the solenoid valve 34 is maintained closed to shut off flow to atmosphere, the solenoid valve 30 is opened to allow flow to atmosphere, and the control member 52 of the shuttle valve 38 is moved from the inlet port 44 to the inlet port 42. Also, the control member 94 of the shuttle valve 78 is moved from the inlet port 82 to the inlet port 76, and the solenoid valve 86 is closed to shut off flow from the shuttle valve 78 to the junction 92. Accordingly, the desiccant tower 14 is operated in an adsorption cycle. Air is supplied to the desiccant tower 14 from the air inlet 16, through the shuttle valve 20, and through the air inlet 32. As air flows through the desiccant tower 14, first the moisture, and then the nitrogen, in the air is adsorbed by the desiccant bed within the desiccant tower 14. Dry, oxygen rich gas then exits the desiccant tower 14 through the gas outlet 38 and flows through the shuttle valve 40 and through the check valve 48 to the mixing tank 50.

The bypass conduit 64 is affixed to the desiccant tower 14 at the coupling point 66 where the moisture, but not the nitrogen, has been adsorbed from the inlet air. The pressure of the gas within the desiccant tower 14 at this coupling point 66 is higher than the pressure of the gas at the junction 56. That is, the pressure of the gas supplied to the mixing tank 50 from the gas outlet 38 of the desiccant tower 14 is reduced due to the pressure drops associated with the desiccant bed in the desiccant tower 14, the shuttle valve 40, and the check valve 48. Therefore, dry gas flows through the bypass conduit 64, through the restriction 68, and through the check valve 70 to the junction 56. The restriction 68 limits the flow of dry gas through the bypass conduit 64 so that the amount of dry gas supplied to the mixing tank 50 by the bypass conduit 64, when mixed with the high oxygen concentration gas supplied through the check valve 48 from the desiccant tower 14, produces the desired concentration of oxygen in the output gas mixture within the mixing tank 50. Increasing the size of the restriction 68 decreases the concentration of oxygen in the output gas mixture within the mixing tank 50, and decreasing the size of the restriction 68 increases the concentration of oxygen in the output gas mixture within the mixing tank 50.

As the desiccant tower 14 is operated in its adsorption cycle, the desiccant tower 12 is operated in a purge cycle. Thus, the desiccant bed of the desiccant tower 12 is purged of nitrogen and moisture by the flow of dry gas from the desiccant tower 14 through the gas outlet 38, through the shuttle valve 40 (i.e. through the purge orifices of the control member 52), through the gas outlet 36 of the desiccant tower 12, through the desiccant tower 12, through the air inlet 28 of the desiccant tower 12, and through the solenoid valve 30 to atmosphere.

Also, while the desiccant tower 14 is operated during its adsorption cycle and the desiccant tower 12 is operated during its purge cycle, as shown in FIG. 3, the check valve 62 prevents gas flow from the junction 56 through the bypass conduit 54 to the coupling point 58 of the desiccant tank 12; otherwise, such a gas flow would disrupt the purge cycle of the desiccant tank 12. The mixing tank 50 levels the concentration of oxygen in the output gas mixture despite fluctuations in the pressure between the junction 56 and the coupling point 66 and despite fluctuations in the concentrations of oxygen in the gases provided by the bypass conduit 64 and by the gas outlet 38 of the desiccant tower 14.

Figure 4:
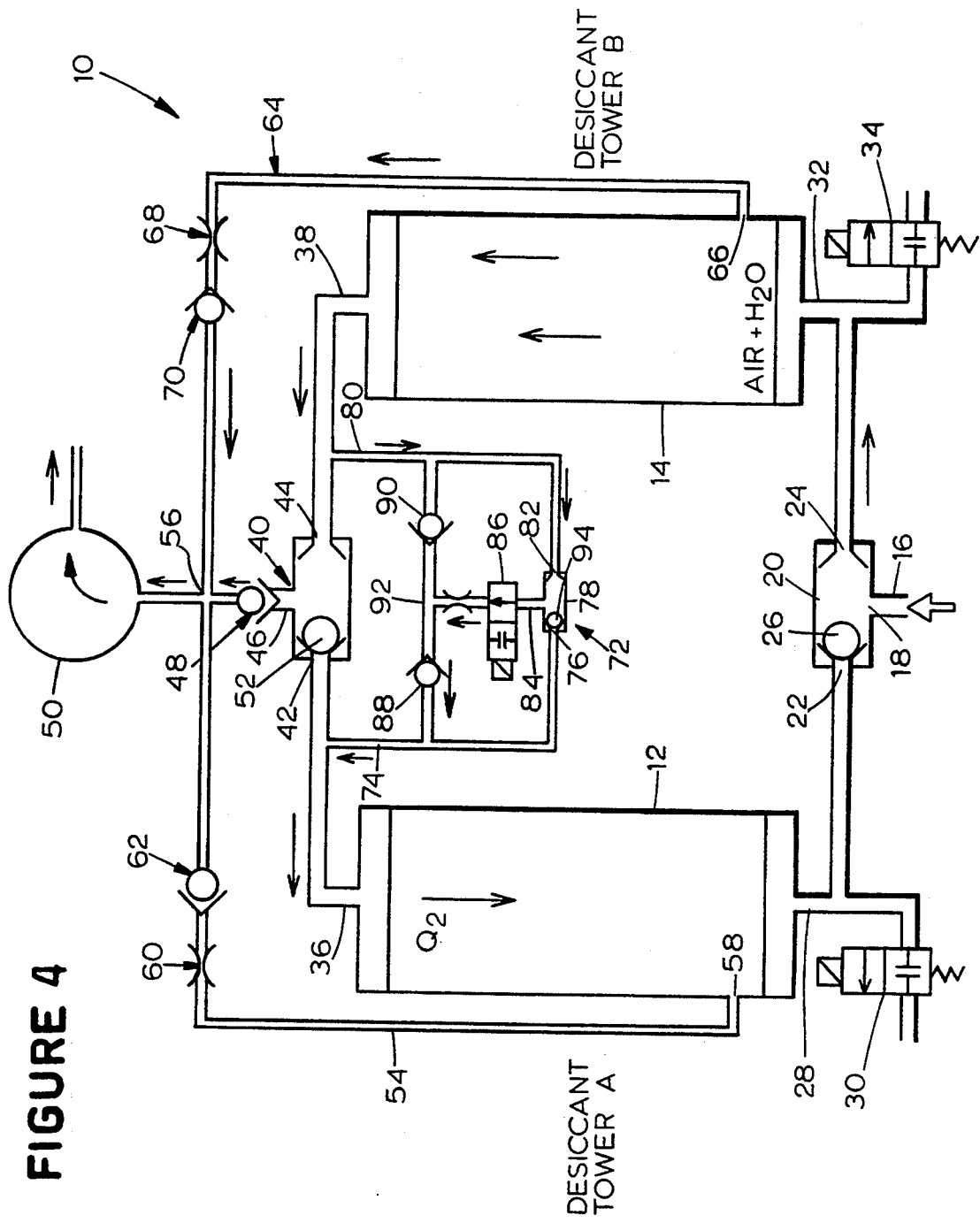

As the oxygen concentration system 10 approaches the point where the desiccant bed within the desiccant tower 14 becomes saturated with moisture and nitrogen and where the desiccant bed within the desiccant tower 12 is substantially purged of the moisture and nitrogen which it had previously adsorbed, the pressurization circuit 72 and the solenoid valve 30 are operated, as shown in FIG. 4, in order to pressurize the desiccant tank 12. That is, the solenoid valve 30 is closed to block flow to atmosphere, the control member 94 of the shuttle valve 78 is maintained against the inlet port 76, and the solenoid valve 86 is opened to allow flow from the shuttle valve 78 to the junction 92. Thus, as shown in FIG. 4, gas flows from the gas outlet 38 of the desiccant tower 14 through the conduit 80, through the shuttle valve 78, through the solenoid valve 86, through the check valve 88, through a portion of the conduit 74, and through the gas outlet 36 into the desiccant tower 12. The solenoid valve 30 prevents the flow of gas from the desiccant tower 12 through its air inlet 28 and through the solenoid valve 30 to atmosphere. Accordingly, gas pressure is built up within the desiccant tower 12.

While the invention has been described in terms of a specific preferred embodiment, it is not intended that the invention be limited thereto. Modifications of the invention will be apparent to those skilled in the art, and, therefore, the invention is to be limited only by the following claims.

I claim:

1. A system for producing an output gas mixture having a desired concentration of oxygen, the desired concentration of oxygen being greater than the concentration of oxygen normally found in air, the system comprising:

oxygen concentration means for receiving inlet air containing oxygen and for producing a first gas by concentrating the oxygen in the inlet air, wherein the first gas has a first concentration of oxygen, wherein the first concentration of oxygen is greater than the desired concentration of oxygen, and wherein the oxygen concentration means has a gas flowing therethrough;

supplying means for supplying a second gas having a second concentration of oxygen, the second concentration of oxygen being less than the first concentration of oxygen, the supplying means being coupled to a coupling point of the oxygen concentration means so as to receive a portion of the gas flowing therethrough such that the second gas is derived from the gas flowing through the oxygen concentration means, the coupling point being selected so that the concentration of oxygen in the gas flowing through the oxygen concentration means at the coupling point is less than the first concentration of oxygen; and, mixing means, coupled to the oxygen concentration means and to the supplying means, for mixing the first and second gases to produce the output gas mixture having the desired concentration of oxygen.

2. The system of claim 1 wherein the supplying means comprises a first conduit coupled to the oxygen concentrating means at the coupling point so that the first gas flows through the first conduit, and wherein the mixing means comprises a second conduit coupled to the oxygen concentrating means so that the second gas flows through the second conduit.

3. The system of claim 2 comprising a flow regulator in one of the first and second conduits to regulate the concentration of oxygen in the output gas mixture.

4. The system of claim 2 wherein the mixing means comprises a mixing tank, the mixing tank being coupled to the first and second conduits and being arranged to maintain a substantially even concentration of oxygen in the output gas mixture despite fluctuations in the first and second concentrations of oxygen.

5. The system of claim 2 wherein the supplying means includes a first check valve in the first conduit, the first check valve being arranged to prevent a flow of the output gas mixture through the first conduit from the mixing means to the oxygen concentration means, and wherein the mixing means includes a second check valve in the second conduit, the second check valve being arranged to prevent a flow of the output gas mixture through the second conduit from the mixing means to the oxygen concentration means.

6. The system of claim 5 comprising a flow regulator in one of the first and second conduits to regulate the concentration of oxygen in the output gas mixture.

7. The system of claim 6 wherein the mixing means comprises a mixing tank, the mixing tank being coupled to the first and second conduits and being arrange to maintain a substantially even concentration of oxygen in the output gas mixture despite fluctuations in the first and second concentrations of oxygen.

8. The system of claim 1 comprising regulating means for regulating the concentration of oxygen in the output gas mixture.

9. The system of claim 1 wherein the mixing means comprises a mixing tank, the mixing tank being coupled to the oxygen concentration means and to the supplying means and being arranged to maintain a substantially even concentration of oxygen in the output gas mixture despite fluctuations in the first and second concentrations of oxygen.

10. The system of claim 9 comprising regulating means for regulating the concentration of oxygen in the output gas mixture.

11. A system for producing an output gas mixture having a desired concentration of oxygen, the desired concentration of oxygen being greater than the concentration of oxygen normally found in air, the system comprising:

first means for supplying inlet air containing oxygen;

a desiccant tower having an inlet coupled to the first means and having an outlet, wherein the desiccant tower is arranged to produce a gas at its outlet by concentrating the oxygen contained in the inlet air, wherein the gas at the outlet of the desiccant tower has a concentration of oxygen, wherein the concentration of oxygen in the gas at the outlet of the desiccant tower is greater than the desired concentration of oxygen in the output gas mixture, and wherein the desiccant tower has a gas flowing therethrough;

second means, having an inlet coupled to the outlet of the desiccant tower and having an outlet, the second means for providing a gas at its outlet based upon the gas at the outlet of the desiccant tower;

a conduit having an inlet and an outlet, the inlet of the conduit being coupled to the desiccant tower at a coupling point so as to receive a portion of the gas flowing therethrough, the coupling point being selected so that the concentration of oxygen in the gas flowing through the desiccant tower at the coupling point is less than the concentration of oxygen in the gas at the outlet of the desiccant tower, the conduit being arranged so as to supply a gas at its outlet, the gas at the outlet of the conduit being derived from the gas flowing through the desiccant tower and having an oxygen concentration level which is substantially equal to the concentration of oxygen in the gas flowing through the desiccant tower at the coupling point; and, mixing means coupled to the outlet of the second means and to the outlet of the conduit for mixing the gases at the outlet of the second means and at the outlet of the conduit in order to produce the output gas mixture having the desired concentration of oxygen.

12. The system of claim 11 wherein at least one of the second means and the conduit includes a flow regulator, the flow regulator being arranged to regulate the concentration of oxygen in the output gas mixture.

13. The system of claim 11 wherein the mixing means comprises a mixing tank, the mixing tank being coupled to the outlet of the second means and to the outlet of the conduit, the mixing tank being arranged to maintain a substantially even concentration of oxygen in the output gas mixture despite fluctuations in the concentrations of oxygen in the gases at the outlet of the second means and at the outlet of the conduit.

14. The system of claim 13 wherein at least one of the second means and the conduit comprises a flow regulator, the flow regulator being arranged to regulate the concentration of oxygen in the output gas mixture.

15. The system of claim 11 wherein the second means includes a check valve arranged to prevent a flow of the output gas mixture through the second means from the mixing means to the desiccant tower, and wherein the conduit includes a check valve arranged to prevent a flow of the output gas mixture through the conduit from the mixing means to the coupling point of the desiccant tower.

16. The system of claim 15 wherein the mixing means comprises a mixing tank, the mixing tank being coupled to the outlet of the second means and to the outlet of the conduit, the mixing tank being arranged to maintain a substantially even concentration of oxygen in the output gas mixture despite fluctuations in the oxygen concentrations of the gases at the outlet of the second means and at the outlet of the conduit.

17. The system of claim 15 wherein at least one of the second means and the conduit includes a flow regulator, the flow regulator being arranged to regulate the concentration of oxygen in the output gas mixture.

18. The system of claim 17 wherein the mixing means comprises a mixing tank, the mixing tank being coupled to the outlet of the second means and to the outlet of the conduit, the mixing tank being arranged to maintain a substantially even output concentration of oxygen in the output gas mixture despite fluctuations in the oxygen concentrations of the gases at the outlet of the second means and at the outlet of the conduit.

19. The system of claim 11 wherein the desiccant tower comprises a first desiccant tower, wherein the conduit comprises a first conduit, wherein the second means has first and second inlets, wherein the first inlet of the second means is coupled to the outlet of the first desiccant tower, and wherein the system further comprises;

a second desiccant tower having an inlet coupled to the first means and having an outlet, wherein the desiccant tower is arranged to produce a gas at its outlet by concentrating the oxygen contained in the inlet air, wherein the gas at the outlet of the desiccant tower has a concentration of oxygen, wherein the concentration of oxygen in the gas at the outlet of the second desiccant tower is greater than the desired concentration of oxygen in the output gas mixture, wherein the outlet of the second desiccant tower is coupled to the second inlet of the second means, wherein the second desiccant tower has a gas flowing therethrough, and wherein the second means is arranged to provide a gas mixture at its outlet based upon the gases at the outlets of the first and second desiccant towers; and, a second conduit having an inlet and an outlet, the inlet of the second conduit being coupled to the second desiccant tower at a coupling point so as to receive a portion of the gas flowing therethrough, the coupling point of the second desiccant tower being selected so that the concentration of oxygen in the gas flowing through the second desiccant tower at its coupling point is less than the concentration of oxygen in the gas at the outlet of the second desiccant tower, the second conduit being arranged so as to supply a gas at its outlet, the gas at the outlet of the second conduit having an oxygen concentration level which is substantially equal to the concentration of oxygen in the gas flowing through the second desiccant tower at its coupling point;

wherein the mixing means is also coupled to the outlet of the second conduit.

20. The system of claim 19 wherein at least one of the outlet of the first desiccant tower and the first conduit comprises a flow regulator, and wherein at least one of the outlet of the second desiccant tower and the second conduit comprises a flow regulator in order to regulate the concentration of oxygen in the output gas mixture.

21. The system of claim 19 wherein the mixing means comprises a mixing tank, wherein the mixing tank is coupled to the outlet of the second means, to the outlet of the first conduit, and to the outlet of the second conduit, and wherein the mixing tank is arranged to maintain a substantially even concentration of oxygen in the output gas mixture despite fluctuations in the oxygen concentrations of the gases at the outlet of the second means, at the outlet of the first conduit, and at the outlet of the second conduit.

22. The system of claim 21 wherein at least one of the outlet of the first desiccant tower and the first conduit comprises a flow regulator, and wherein at least one of the outlet of the second desiccant tower and the second conduit comprises a flow regulator in order to regulate the concentration of oxygen in the output gas mixture.

23. The system of claim 19 wherein the first and second means each comprises a valve having a control member being arranged to control which of the first and second desiccant towers is operated in an adsorption cycle and which is operated in a purge cycle, wherein the first conduit includes a check valve arranged to prevent a flow of the output gas mixture through the first conduit from the mixing means to the coupling point of the first desiccant tower, and wherein the second conduit includes a check valve arranged to prevent a flow of the output gas mixture through the second conduit from the mixing means to the coupling point of the second desiccant tower.

24. The system of claim 23 wherein the mixing means comprises a mixing tank, wherein the mixing tank is coupled to the outlet of the second means, to the outlet of the first conduit, and to the outlet of the second conduit, and wherein the mixing tank is arranged to maintain a substantially even concentration of oxygen in the output gas mixture despite fluctuations in the oxygen concentrations of the gases at the outlet of the second means, at the outlet of the first conduit, and at the outlet of the second conduit.

25. The system of claim 23 wherein at least one of the outlet of the first desiccant tower and the first conduit comprises a flow regulator, and wherein at least one of the outlet of the second desiccant tower and the second conduit comprises a flow regulator in order to regulate the concentration of oxygen in the output gas mixture.

26. The system of claim 25 wherein the mixing means comprises a mixing tank, wherein the mixing tank is coupled to the outlet of the second means, to the outlet of the first conduit, and to the outlet of the second conduit, and wherein the mixing tank is arranged to maintain a substantially even concentration of oxygen in the output gas mixture despite fluctuations in the oxygen concentrations of the gases at the outlet of the second means, at the outlet of the first conduit, and at the outlet of the second conduit.

* * * * *